US007624920B2

(12) United States Patent
Kromann et al.

(10) Patent No.: US 7,624,920 B2
(45) Date of Patent: Dec. 1, 2009

(54) STORING ACCOUNT INFORMATION WITH RELATED DATA IN A COMMON STORE

(75) Inventors: Paul K. Kromann, Redmond, WA (US); Garrett R. Vargas, Sammamish, WA (US); Steven A. Cover, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 393 days.

(21) Appl. No.: 11/558,347

(22) Filed: Nov. 9, 2006

(65) Prior Publication Data

US 2007/0124514 A1 May 31, 2007

Related U.S. Application Data

(63) Continuation of application No. 10/804,769, filed on Mar. 19, 2004, now Pat. No. 7,159,768.

(51) Int. Cl.
*G06K 5/00* (2006.01)
(52) U.S. Cl. ........................................ 235/380; 235/383
(58) Field of Classification Search ................. 235/380, 235/375, 492, 487, 486, 383, 493, 441; 705/40–45
See application file for complete search history.

(56) References Cited

U.S. PATENT DOCUMENTS

| 5,724,525 | A | * | 3/1998 | Beyers et al. ................. 705/40 |
| 6,023,684 | A | * | 2/2000 | Pearson ..................... 705/36 R |
| 7,159,768 | B2 | * | 1/2007 | Kromann et al. ............. 235/380 |
| 2001/0032182 | A1 | * | 10/2001 | Kumar et al. .................. 705/40 |
| 2002/0133459 | A1 | * | 9/2002 | Polk et al. ..................... 705/40 |
| 2004/0107165 | A1 | | 6/2004 | Blair |
| 2004/0254881 | A1 | * | 12/2004 | Kumar et al. .................. 705/40 |
| 2005/0080861 | A1 | | 4/2005 | Daniell |
| 2005/0205664 | A1 | * | 9/2005 | Kromann et al. ............. 235/380 |
| 2007/0158638 | A1 | | 7/2007 | Peters |

OTHER PUBLICATIONS

Office Action dated Aug. 24, 2005 cited in U.S. Appl. No. 10/804,769 (Copy Attached).
Office Action dated Mar. 22, 2006 cited in U.S. Appl. No. 10/804,769 (Copy Attached).
Notice of Allowance dated Sep. 14, 2006 cited in U.S. Appl. No. 10/804,769 (Copy Attached).

* cited by examiner

*Primary Examiner*—Thien M Le
(74) *Attorney, Agent, or Firm*—Workman Nydegger

(57) ABSTRACT

Described is a system and method in which the account settings for managing (e.g., sending and receiving) data are maintained in association with the managed data, such that the account settings and data remain unified yet are independent of any computing device. In one electronic mail application implementation, the mail message data and the account settings are maintained in a common store of a same storage volume that is independent of the device, such as on a removable memory card. When a user connects the volume such as by inserting the card, the device automatically reads the email account settings, which are then used to properly receive or send any corresponding messages. Because the account settings are maintained in the same store with any related content (e.g., message) data, the settings and related data thus travel with the user/card when moved to another device.

20 Claims, 5 Drawing Sheets

STORING ACCOUNT INFORMATION WITH RELATED DATA IN A COMMON STORE

CROSS-REFERENCE TO RELATED APPLICATIONS

The present application is a continuation application of U.S. application Ser. No. 10/804,769 filed Mar. 19, 2004 and entitled "Storing Account Information With Related Data In A Common Store" which is incorporated herein by reference in its entirety.

FIELD OF THE INVENTION

The invention relates generally to configuring computing devices, particularly mobile computing devices including computers and mobile telephones.

BACKGROUND

Mobile computing devices such as personal digital assistants, contemporary mobile telephones, hand-held and pocket-sized computers, tablet personal computers and the like are becoming important and popular user tools. In general, they have become small enough to be extremely convenient, while consuming less battery power, and at the same time have become capable of running more powerful applications.

Via a remote connection, various messages such as email messages can be sent and received. Other types of messages that may be sent and received include Short Message Service (SMS) messages, a standard for sending short alphanumeric messages (maximum 160 characters) to or from mobile phones in mobile communications networks. Such devices are able to store their received and other user data locally and/or by connecting to networks, including the Internet. In general, these computers and computer-based mobile telephones (such as those running Microsoft Windows® Mobile software for Smartphones) allow users to make conventional mobile telephone calls, access the Internet, send and receive messages and attachments, store contacts, maintain appointments and do many other things contemporary desktop computers can now do.

In certain enterprise scenarios, mobile devices are not assigned to individual users on a permanent basis, but are instead checked out on a temporary basis. For example, a delivery driver may check out a mobile device at the beginning of his shift and return it at the end of his shift. A driver on the next shift may then check out that same device and use it during her shift. While this arrangement works well with applications that the users can easily share, certain applications are user-specific, with the settings for those applications maintained in a registry on the device. This is one reason why more powerful personal computers and the like running contemporary operating systems allow users to log in under different accounts; each different user has personalized settings maintained in corresponding registry settings for that user, whereby users can preserve a great deal of customized information with their corresponding user account.

However, mobile devices are generally configured for a single user, essentially as a result of limited resources including storage. As a result, if the device is shared by users, such as in the example shift-change scenario described above, any device and account configuration information heretofore also has been shared (public) among the users of the device. This greatly limits an enterprise's ability to share devices while maintaining the users' privacy. For example, if email is one of the tools that a company wants to use to communicate with its employees, sharing is not practical with contemporary mobile devices, because if the device is configured with an email account for each user, each user can see each other user's email messages.

Reconfiguring a device to only have the current user's settings involves changing substantially more data than a username, and thus changing the device to provide privacy for each user is difficult. For example, different users' email accounts may have different incoming server names, outgoing server names, credentials and settings for each and so on. Without clearing out the most recent user's account settings (and any other stored account settings), and reconfiguring the shared device each time a different user wants to use it, the subsequent user is provided with access to the previous user's (or previous multiple users') email. Reconfiguration is an operation that requires a relatively sophisticated user, and thus sharing is not practical in most enterprises. What is needed is a straightforward way for computing devices (particularly those that do not allow individual user log-on accounts) to handle different accounts with respect to certain tasks without requiring conventional device reconfiguration, e.g., to clear previous account settings and add current account settings.

BRIEF SUMMARY

Briefly, the present invention is directed towards a system and method in which the account settings for managing (e.g., sending and receiving) data are maintained in association with the managed data, such that the account settings and data remain unified yet are independent of any computing device. By storing the account configuration settings in the same store with its related data, the account is fully portable. For example, with a mail (inbox) application program, the system and method maintain mail account settings (e.g., for managing email message data) in association with the mail data (e.g., the email message content), such that whenever a user operates a mobile device, the user gets his or her email messages based on those settings, not another user's email messages based on the other user's settings.

In one implementation, the message data and the account settings are maintained in a set of data that is on the same storage volume, such as a removable memory card (e.g., a multimedia, or MMC card). When a user connects the medium such as by inserting his or her card, the device automatically reads the email account settings, which are then used to properly receive or send any corresponding messages. Because the account settings are maintained in the card in the same store with any persisted data that is related, such as saved messages, the settings and related data thus travel with the user/card when moved to another device.

In this example, when a mail application is loaded, the device (via a message store managing component) will check for mail stores currently accessible to the device, which may reside in internal storage or current external storage. Also, upon notification of a card being inserted, the message store managing component re-checks (enumerates) its mail stores. When a new mail store is found, the message store managing component reads the account information from the store, and uses it to load the account into the mail application's user interface. If an external storage card that has a mail store on it is removed from the device, the removal is detected and the mail application is informed, and the mail application automatically removes the mail account and its data from the user interface.

As can be readily appreciated, the present invention makes application (e.g., mail) account information very portable and allows users to take their storage card with their e-mail account configuration and data to any device. For example, in the above-mentioned enterprise scenario, users can have their own memory card, and whenever assigned a device, simply insert the card to see their mail, which happens automatically and without additional configuration. A network share or other storage mechanism similarly provides a suitable common store.

Other advantages will become apparent from the following detailed description when taken in conjunction with the drawings, in which:

DETAILED DESCRIPTION

Exemplary Operating Environment

Figure 1:
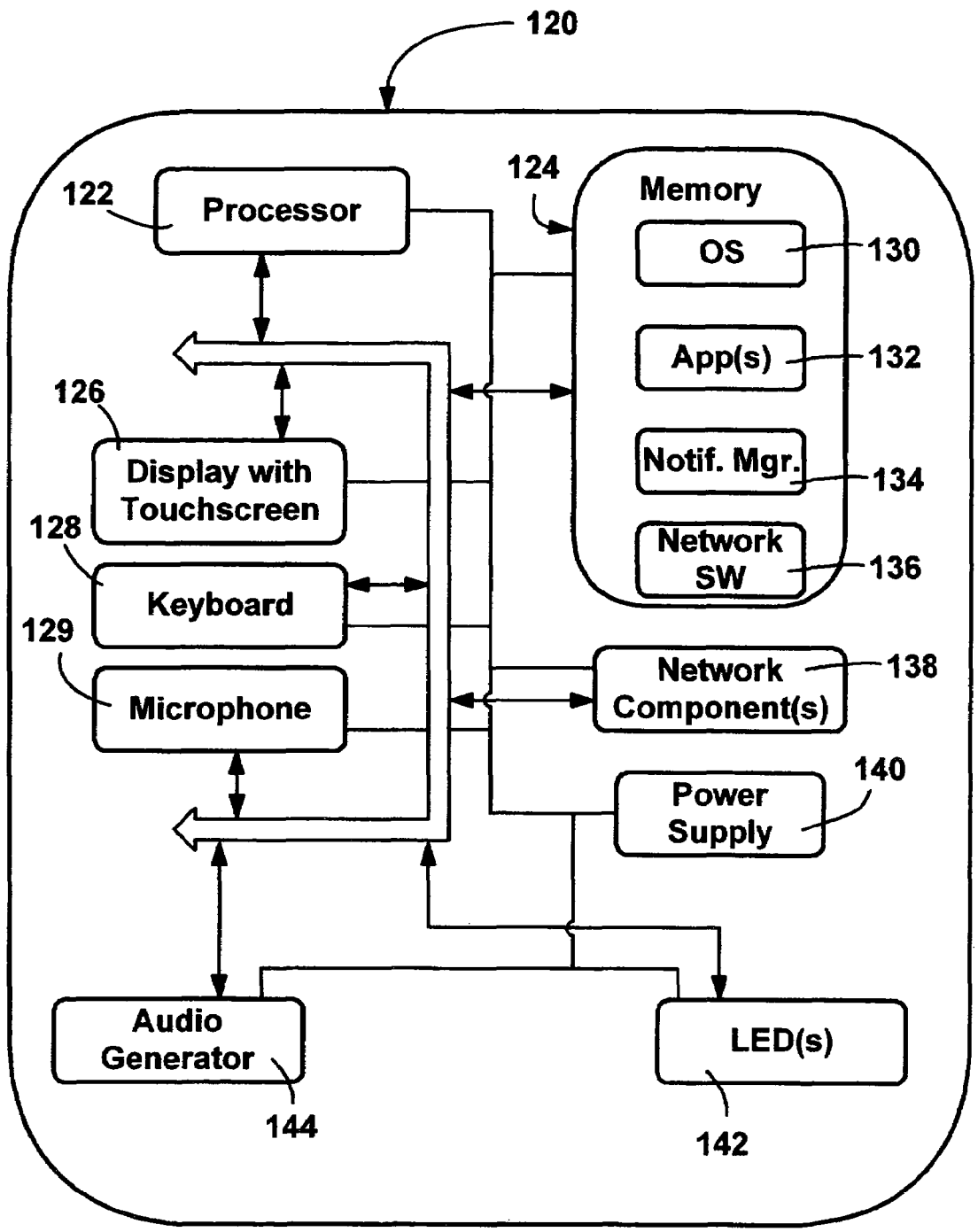
FIG. 1 is a block diagram generally representing a computer system into which the present invention may be incorporated.

FIG. 1 shows functional components of one such handheld computing device 120, including a processor 122, a memory 124, a display 126, and a keyboard 128 (which may be a physical or virtual keyboard, or may represent both). A microphone 129 may be present to receive audio input. The memory 124 generally includes both volatile memory (e.g., RAM) and non-volatile memory (e.g., ROM, PCMCIA cards, and so forth). An operating system 130 is resident in the memory 124 and executes on the processor 122, such as the Windows® operating system from Microsoft Corporation, or another operating system.

One or more application programs 132 are loaded into memory 124 and run on the operating system 130. Examples of applications include email programs, scheduling programs, PIM (personal information management) programs, word processing programs, spreadsheet programs, Internet browser programs, and so forth. The handheld personal computer 120 may also include a notification manager 134 loaded in the memory 124, which executes on the processor 122. The notification manager 134 handles notification requests, e.g., from the application programs 132. Also, as described below, the handheld personal computer 120 includes networking software 136 (e.g., hardware drivers and the like) and network components 138 (e.g., a radio and antenna) suitable for connecting the handheld personal computer 120 to a network, which may include making a telephone call.

The handheld personal computer 120 has a power supply 140, which is implemented as one or more batteries. The power supply 140 may further include an external power source that overrides or recharges the built-in batteries, such as an AC adapter or a powered docking cradle.

The exemplary handheld personal computer 120 represented in FIG. 1 is shown with three types of external notification mechanisms: one or more light emitting diodes (LEDs) 142 and an audio generator 144. These devices may be directly coupled to the power supply 140 so that when activated, they remain on for a duration dictated by a notification mechanism even though the handheld personal computer processor 122 and other components might shut down to conserve battery power. The LED 142 preferably remains on indefinitely until the user takes action. Note that contemporary versions of the audio generator 144 use too much power for today's handheld personal computer batteries, and so it is configured to turn off when the rest of the system does or at some finite duration after activation.

Note that although a basic handheld personal computer has been shown, virtually any device capable of receiving data communications and processing the data in some way for use by a program, such as a mobile telephone, is equivalent for purposes of implementing the present invention.

Storing Account Information with Related Data

The present invention is generally directed towards handling messages and similar data communications, such as email messages, particularly on small mobile computing devices including mobile telephones. As will be understood, however, the present invention is not limited to any type of computing device, and may, for example, be used with relatively large, stationary computing devices. Moreover, although the present invention will be generally described in terms of email applications, accounts and messages, it will be understood that the present invention is not limited to any particular applications, as essentially any computer that has its own per-user account settings can benefit from the present invention. Further, the present invention will be primarily described in terms of maintaining the account information and its related data on a common store, particularly a removable memory storage card, however other media for common stores are equivalent, such as network shares, read-writeable CD-ROMs, USB memory devices and so on.

Figure 2:
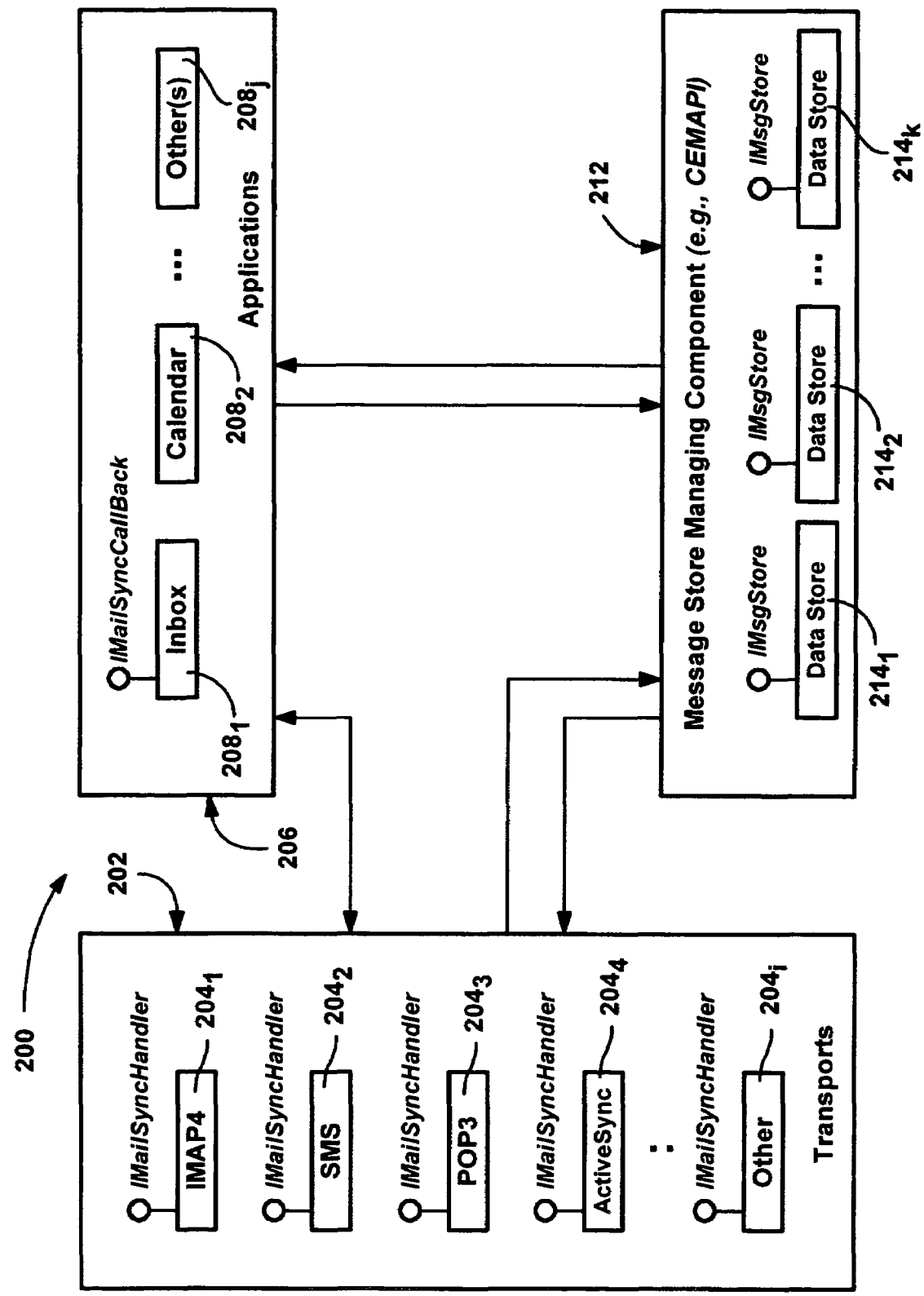
FIG. 2 is a block diagram representing a communications handling architecture into which the present invention may be incorporated.

Turning to FIG. 2, there is shown an architecture, generally designated 200, for handling mail-related messages and the like. One such architecture 200 is currently implemented in devices running Windows® for Mobile Devices. In this example architecture, a number of transports 202 are provided, with each transport $204_1$-$204_i$ configured to receive (and transmit) different types of messages, e.g., IMAP4 (Internet Message Access Protocol version 4), SMS, POP3 (Post Office Protocol version 3), ActiveSync (which supports synchronizing data between a Windows®-based desktop computer or an exchange server and Microsoft Windows® CE .NET-based portable devices), and others. Such others may include IM (Instant Messaging), MMS (Multimedia Messaging Service) and the like.

In general, application programs 206 are running on the mobile device, including applications that send and receive communications. Such application programs may include an inbox application $208_1$, a calendar application $208_2$ and others $208_j$, such as a contacts-related application program. In accordance with an aspect of the present invention and as described below with reference to FIGS. 3-5, one or more of these applications $208_1$-$208_j$ may be configured to have its account settings maintained in a portable data store $214_1$-$214_k$, along with user data related to those settings, whereby the account settings move with the data store (e.g., $214_1$)

rather than with the device. Note that the data stores do not necessarily correspond to an application program; for example, the inbox application $208_1$ may have multiple data stores maintained for it, e.g., one for IMAP4 messages, one for POP3 messages, and so on.

A message store managing component 212 (e.g., CEMAPI) such as implemented in an API allows applications such as the inbox application $208_1$ to store messages and retrieve stored messages as desired. In general, the message store managing component 212 abstracts the storage from applications such as the inbox application $208_1$, such that in essence the application only knows that message data exists somewhere, and that the data can be accessed via the message store managing component 212. Note that another such program that can receive data from a data store is an operating system component, and as such, any such computer program code should be considered equivalent for purposes of the present invention.

It should be noted that rather than providing the storage, although more complex, it is essentially equivalent to have an alternative implementation in which the inbox program works directly with the storage. Thus, as used herein, the term "message-handling mechanism" will be used to refer to the inbox application or the like and/or the message storing component, and may also include the concept of a transport, where appropriate.

In one implementation, the message stores $214_1$-$214_j$ are COM (Component Object Model) objects associated with each inbox application service, and the message store managing component 212 provides access to these message stores via an IMsgStore interface. In this implementation, the message store libraries provide the IMsgStore interface, which provides access to unique, transport-specific storage. For example, the Inbox may store SMS messages in one message store, IMAP4 messages in another, and so on. The IMsgStore::GetProps and IMsgStore::SetProps methods accessed through each messages store's IMsgStore interface are used to access custom properties of the store.

Figure 3:
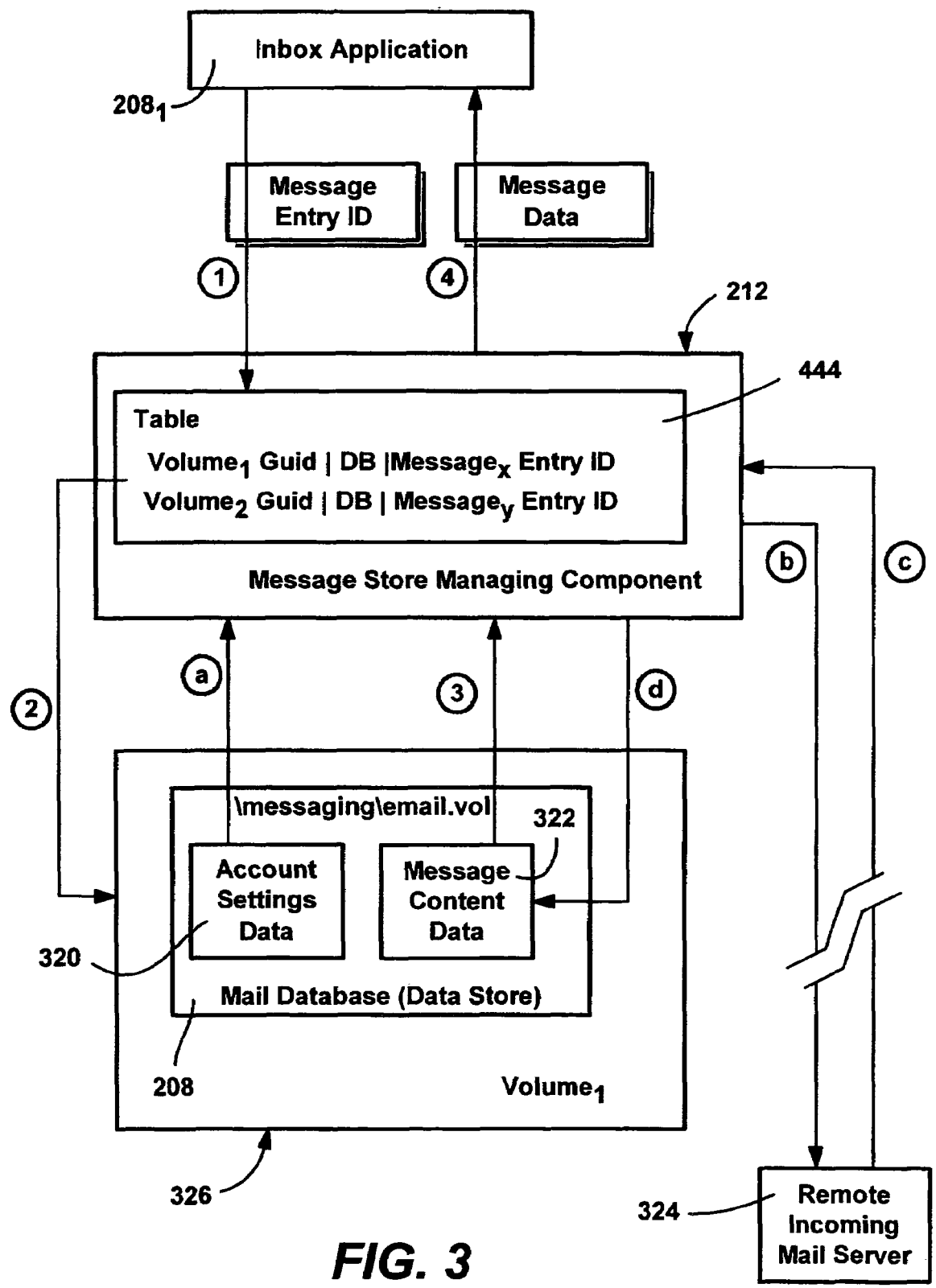
FIG. 3 is a general representation of how messages and account settings may be maintained in various stores, in accordance with an aspect of the present invention.

In accordance with an aspect of the present invention, FIG. 3 shows how account settings 320 maintained with message content data 322 in a common data store 208 are used by the message store managing component 212 to update the message content data 322. FIG. 3 also shows how the application accesses the messages via the message store managing component 212.

In general, as represented in FIG. 3, at appropriate times, such as when the inbox application first connects to the message store managing component 212 as a client, or when a new data store is detected, the message store managing component 212 uses the account settings 320 that are in the same common store in order to retrieve the message content data 322 from an incoming mail server. Although not shown, any messages waiting to be sent can likewise be sent to an outgoing server at this time.

In keeping with the present invention, the message store managing component 212 reads the account settings data 320 from a file or the like and obtains the needed information directly from the store (as opposed to from a central registry on the device). This is represented by the arrow labeled with circled letter "a" in FIG. 3. Among the account information is the name of the incoming (e.g., POP3) mail server, any credentials necessary to gain access (username and password) and other settings, such as whether SSL is required. With the necessary information, the message store managing component 212 automatically contacts the remote mail server 324 and retrieves the messages, as represented by the arrows labeled with circled letters "b" and "c" in FIG. 3. The message store managing component 212 incorporates any received message data into the message content data 322 in the mail database 208, as represented by the arrow labeled with circled letter "d" in FIG. 3.

In general, any per-user and user-customizable settings may be maintained in the account settings. Thus, a username, incoming and outgoing server names, with any needed credentials for either, SSL settings, folders to synchronize, synchronization rules, filtering rules, search folders, days to keep messages, size limitations, preferences, language data and other data may be maintained per-user.

Figure 4:
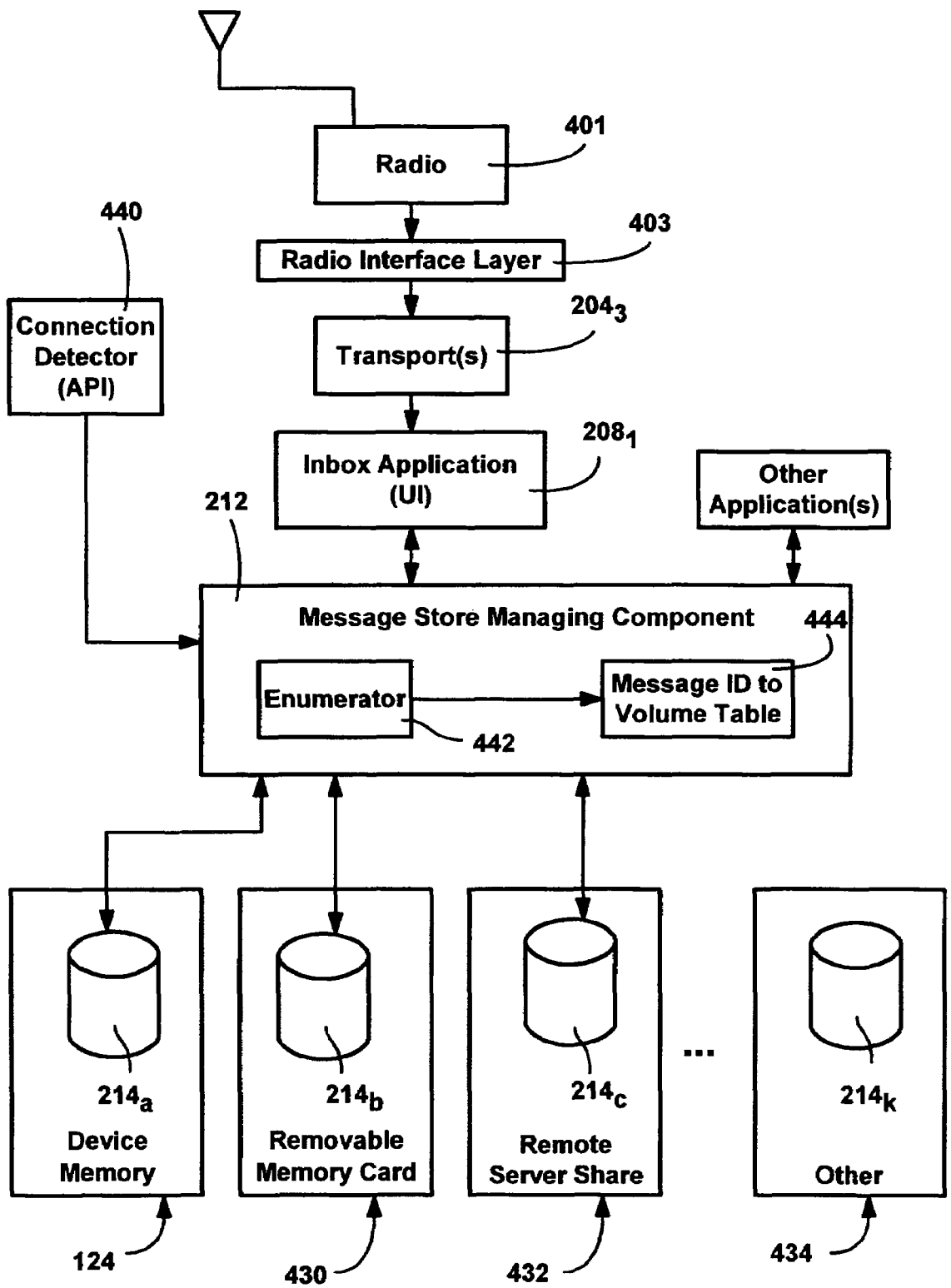
FIG. 4 is a block diagram representing the interactions between various components in order to use stored account settings to provide an application program with data related to those account settings, in accordance with an aspect of the present invention.

FIG. 4 shows how the message data is received by components for handling a message, such as for a POP3 email message. When the POP3 transport $204_3$ establishes a data connection to the mail server 324 (via a radio 401 and radio interface layer 403), the POP3 transport $204_3$ requests information about new messages from the server, and then downloads any new content. The inbox program $208_1$ receives the message and has its internal POP3 transport component handle the message. The inbox program instructs the message store managing component 212 to store the message, (e.g., by calling a create message method of the message store managing component 212), which then writes it to the appropriate common store location. For example, if a user has inserted a removable memory card 430 for POP3 messages, the message storing component 212 will write message data to the appropriate database $214_b$ on the card 430. ActiveSync and IMAP4 data may be stored in a database $214_a$ in the device memory 124. (Note that in FIG. 4, letters are used as subscripts for the databases instead of numbers as in FIG. 2, because any of the memory storage mechanisms may have any number of these databases, e.g., the device memory 124 can contain data store $214_1$ and $214_2$ of FIG. 2.) A remote server share 423 may alternatively maintain the message data and the account settings associated with that message data in a like database $214_k$. Other types of storage 434, e.g., personal storage on the internet, may be likewise used for the common store.

Any time that a change to accessible memory is detected, the message store managing component enumerates the data stores that it can access. For example, well-documented APIs 440 can be used to provide a notification whenever a memory card is installed or removed. An enumerator component 442 of the message store managing component then looks to each volume for whether the common store for account data and message content is accessible. For example, in one implementation, a volume containing such a common store will have a folder named \messaging\email.vol or some other appropriately-named and agreed-upon folder name. As described below, the volume ID (e.g., a GUID or other identifier unique to the computing environment) is added to a table so that the message store managing component 212 can later locate messages that are based on a message identifier in the correct volume.

It should be noted that while the common data store may be maintained on a common physical storage mechanism, such as a removable memory card, the common data store 208 may also be a logical data store, maintained on more than one physical storage mechanism, for example a network share on a plurality of servers. What is distinct from conventional systems is that the accounts settings are accessed via the same logical path, e.g., in or under the same folder of a storage volume 326 that is not necessarily a fixed part of the device.

As can be readily appreciated, maintaining the account settings and the message content data in the same store provides a number of significant advantages. One is that a device may be shared yet be configured differently for each user by maintaining each common store on a removable memory card. A user simply inserts his or her memory card in any compatible device that can run the corresponding application program for that account data, and the message content is automatically there. This works well with the shared company device/shift-change example described above, but also enables a user to temporarily borrow any suitable device from any source, download email messages to the inserted card, and remove the card taking any saved email messages along.

Similarly, if any device can be connected to a network share or personal internet storage location that maintains the data store, the data store can be updated with the message content automatically, again because the correct account settings are present with the message content that is stored. Note that another benefit to the memory card or network share examples over conventional devices is that the data is not lost if power is lost on the device. Some security may be implemented, such as passwords and encryption technology so that a lost card cannot be used, or a remote storage location improperly accessed.

Returning to FIG. 3, when an inbox application requests a message, e.g., by a message identifier 350 (as represented by the arrow labeled with circled numeral "1"), the message store managing component 212 needs to find which volume and database the message is stored in. Note that prior to the present invention, the message store managing component 212 only needed to locate the database, since there was only one volume. The table 444 provides the relationship.

More particularly, in one implementation, the message ID is a single, opaque entity to application programs. From the perspective of the message store managing component 212, the message ID is broken into parts. Part of the message ID contains a volume index that is used to look up the specific volume information in the table 444 (or in a cached representation). The messages on a volume have the same volume index as part of their IDs.

Once the correct volume is located, the message is retrieved from the message content data on that volume, as represented in FIG. 3 via the arrows labeled with circled numerals "2" and "3". The message data is then returned to the inbox application, such as for display in its user interface, as represented by the arrow labeled with circled numeral "4" in FIG. 3.

Figure 5:
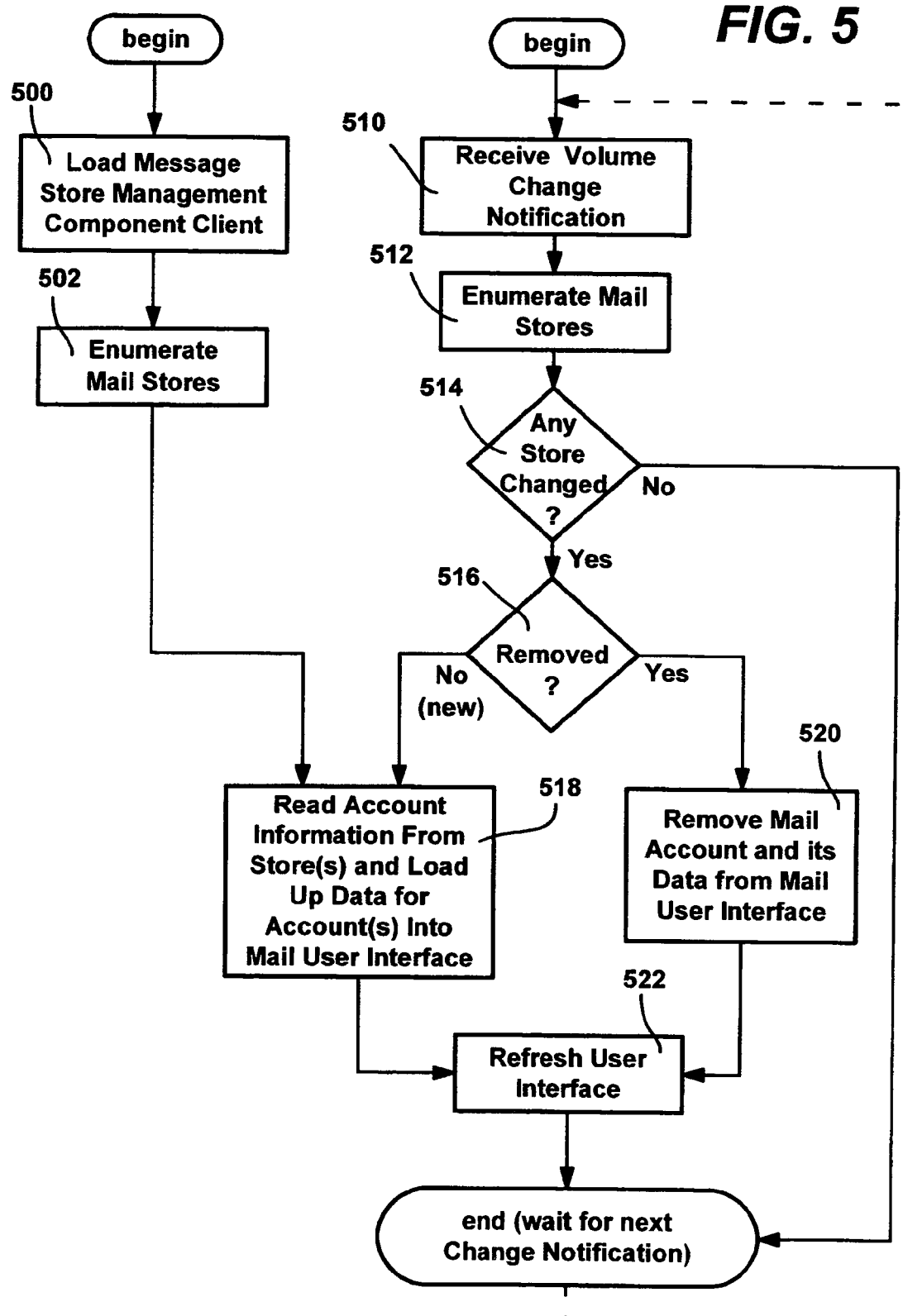
FIG. 5 is a flow diagram representing actions taken to obtain account information for an application in one example implementation, in accordance with an aspect of the present invention.

Turning to an explanation of the operation of the present invention with respect to obtaining the account settings, FIG. 5 shows various logical steps that are taken, beginning at step 500 which represents the client (e.g., the inbox application program) connecting to the message store managing component 212. At step 502, the mail stores are enumerated, which includes updating the volume tracking table 444 with the volume information. In keeping with the present invention, the account information read from each mail store is used to load up the data for each account, as represented by step 518. At this time, the mail program's user interface displays some portion of the mail data, and the automatic loading process ends until some change is detected to the volumes.

When a change is detected, such as a memory card being inserted or removed, or a network connection change being made, as represented by step 510, the mail stores are again enumerated, as represented by step 512. To this end, the attached storage volumes are examined for the appropriate mail folder. If no stores have changed, e.g., a memory card was inserted but did not have a mail store on it, via step 514 the process again ends and awaits another notification. Otherwise, step 516 tests for whether a mail store was added or removed. If a new mail store was (or stores were) added, step 516 branches to step 518 to read the account information from each new mail store and uses that account information to load up the data for each account. If instead a mail store was (or mail stores were) removed as evaluated at step 516, the mail account and its mail data is removed.

In general, the mail application is informed of the state change, and refreshes the user interface as represented by step 522. For new mail accounts, the messages are thus shown automatically, e.g., following insertion of a memory card. For removed mail accounts, the inbox application recognizes this and automatically removes the mail account and its data from the user interface.

Although the present invention was primarily described with reference to mail data, other applications can benefit from the present invention. For example, calendar-related applications, contacts-related applications, and so on have both account data and content data (the appointments and contact information). In general, any application that has account information and content data related to that account can benefit from the present invention.

As can be seen from the foregoing detailed description, there is provided a method and system for associating account data with the content data related to that account such that a user of a mobile device obtains the desired data. By maintaining the account data and the related content data in a common store, the account essentially travels with the user, rather than with the device. The present invention thus provides numerous advantages and benefits needed in contemporary computing.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing device, the computing device including a processor and system memory, a method comprising:
   maintaining account data in a common store with content data related to that account data;
   detecting that the common store is connected to the computing device;
   reading the account data to update the content data with content data from another source in response to detecting connection of the common store; and
   the processor refreshing a user interface of an application program at the computing device to present the updated content data in response to detecting connection of and reading account data from the common store, refreshing the user interface including removing any previously presented content data corresponding to other account data read from other previously connected common stores.

2. The method of claim 1 wherein the common store is on a storage mechanism that is selectively connectable to the computing device.

3. The method of claim 2 wherein the storage mechanism that is selectively connectable to the computing device comprises a removable memory card, and wherein reading the account data to update the content data with content data from another source occurs in response to insertion of the memory card being detected.

4. The method of claim 1 wherein refreshing a user interface of an application program at the computing device to present the updated content data in response to detecting connection of and reading account data from the common store comprises updating the user interface of a mail related application based on the content that is updated after reading the account data.

5. The method of claim 1 further comprising, automatically updating the user interface to remove the updated content data upon detecting that the common store is no longer connected to the computing device.

6. The method of claim 2 wherein the storage mechanism that is selectively connectable to the computing device comprises a network storage mechanism that is logically connected to or disconnected from the computing device based on a network connection state, and further comprising, receiving a notification corresponding to a change in the network connection state.

7. The method of claim 1 wherein refreshing the user interface of an application program comprises refreshing a user interface for one of a mail-related application program, a calendar-related application program, and a contacts-related application to present the updated content data.

8. The method of claim 1 further comprising, maintaining the common store as part of a single storage volume.

9. The method of claim 8 wherein reading account data from the common store to update the content data comprises mapping messages to the common store based on data corresponding to an identifier of the storage volume.

10. A computer program product for use at a computing device, the computer program product for implementing a method for maintain account information, the computer program product comprising one or more computer storage computer-readable media having stored thereon computer-executable instructions that, when executed at a processor, cause the computing device to perform the method, including the following:

maintain account data in a common store with content data related to that account data;

detect that the common store is connected to the computing device;

read the account data from the common store to update the content data with content data from another source in response to detecting connection of the common store; and refresh a user interface of an application program at the computing device to present the updated content data in response to detecting connection of and reading account data from the common store, refreshing the user interface including removing any previously presented content data corresponding to other account data read from other previously connected common stores.

11. In a computing device, the computing device including a processor and system memory, a method comprising:

obtaining account settings that are maintained along with current content data in a selectively connectable common store, the account settings for authorizing retrieval of other content data from a content source;

using the obtained account settings to retrieve other content data from the content source; and the processor updating current content data in the common store with the retrieved other content data such that updated content for the account settings is stored along with the account settings and remains associated with the account settings subsequent to disconnecting the common store from the computing device and connecting the common store to another different computing device.

12. The method of claim 11 further comprising updating a user interface in association with updating the content data.

13. The method of claim 11 wherein the common store is contained in a single storage volume, and wherein updating the content data comprises mapping messages to the storage volume.

14. The method of claim 13 further comprising, enumerating the common store based on the storage volume becoming available for access.

15. The method of claim 11 further comprising, enumerating the common store based on the storage volume becoming available for access.

16. The method of claim 11 wherein the storage mechanism comprises a removable memory card, and wherein obtaining the account settings occurs automatically following insertion of the memory card.

17. The method as recited in claim 16 further comprising, updated a user interface based on insertion of the memory card.

18. The method as recited in claim 16 further comprising, updated a user interface based on removal of the memory card.

19. The method as recited in claim 11 wherein the storage mechanisms is access via a network connection, and wherein obtaining the account settings occurs automatically upon establishing a network connection to access the storage mechanism.

20. The method of claim 11 wherein obtaining account settings comprises reading at least one element of a set containing: username, logon credentials, and server identity.

* * * * *